United States Patent [19]

Albrecht et al.

[11] Patent Number: 4,604,853
[45] Date of Patent: Aug. 12, 1986

[54] METHOD AND APPARATUS FOR SEALING A CONTAINER WITH A TAMPER-EVIDENT CLOSURE

[75] Inventors: Leman P. Albrecht; Darwin L. Ellis, both of Richmond, Ind.

[73] Assignee: Aluminum Company of America, Pittsburgh, Pa.

[21] Appl. No.: 677,283

[22] Filed: Dec. 3, 1984

[51] Int. Cl.$^4$ ............................................. B65B 7/28
[52] U.S. Cl. ....................................... 53/487; 53/141; 53/290; 53/442
[58] Field of Search ............ 53/290, 441, 442, 487, 53/488, 490, 141, 313; 156/82, 86, 294, 497

[56] References Cited

U.S. PATENT DOCUMENTS

| | | | |
|---|---|---|---|
| 3,289,383 | 12/1966 | Foss | 53/141 |
| 3,426,504 | 2/1969 | Christensson | 53/141 |
| 3,645,062 | 2/1972 | Hannon | 53/488 |
| 3,673,761 | 7/1972 | Leitz | 53/488 |
| 3,844,861 | 10/1974 | Irish | 156/86 |
| 4,015,401 | 4/1977 | St. Amand et al. | 53/487 |
| 4,272,945 | 6/1981 | Obrist | 53/557 |
| 4,349,399 | 9/1982 | Obrist et al. | 156/86 |

*Primary Examiner*—John Sipos
*Assistant Examiner*—Donald R. Studebaker
*Attorney, Agent, or Firm*—Max L. Williamson; J. Stewart Brams

[57] ABSTRACT

A container capping method and system for applying mechanical lock type tamper-evident closures to containers wherein the closures are heated prior to closure application to temporarily increase the flexibility thereof in a manner that tamper-indicating portions of the closures more readily withstand the closure application process without incurring visible damage or otherwise degrading the tamper-indicating function.

4 Claims, 3 Drawing Figures

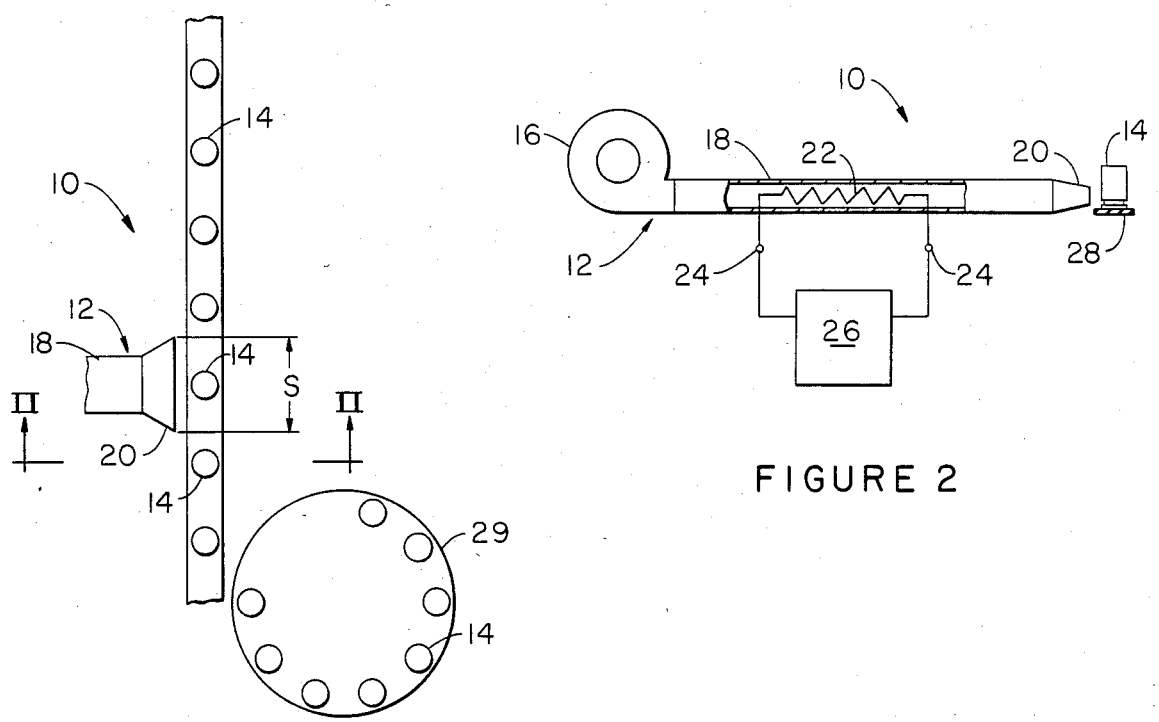
FIGURE 1
FIGURE 2
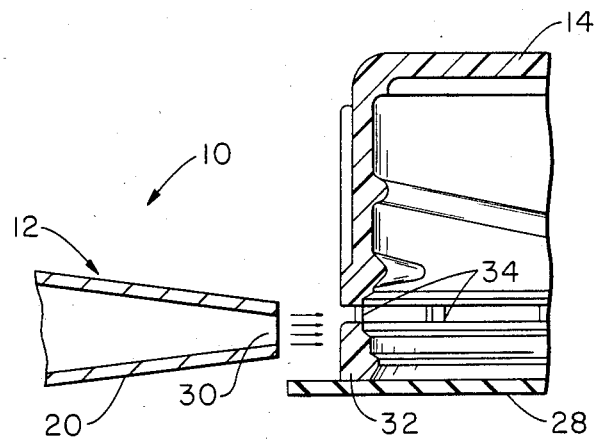
FIGURE 3

METHOD AND APPARATUS FOR SEALING A CONTAINER WITH A TAMPER-EVIDENT CLOSURE

BACKGROUND OF THE INVENTION

In the art of container closures, it is well known to provide product packaging with tamper-evident closure systems which are intended to reveal, upon visual inspection, whether the package has been previously opened. Such tamper-evident packaging considerations have recently assumed increased importance and have become the subject of considerable attention owing to various instances of intentional tampering with consumer products such as pain relievers and foodstuffs.

Tamper-evident closures, for bottles and jars especially, have most commonly been provided as formed aluminum or molded plastic screw caps. In general, all such closures engage a bottle or other container with a locking engagement sufficient to prevent disengagement of the closure without destruction of at least part of the lock portion of the closure. One example of a plastic tamper-evident closure system is a screw cap closure which closes the mouth of a container, such as a bottle or jar, and which includes an annular tear-away band attached to the lower extremity of the screw cap skirt by frangible bridges. The band typically is formed to engage a flange portion of the jar or bottle during first opening thereof to break the frangible bridges, thus separating the band from the cap skirt. Upon subsequent closing of the container, the fractured bridges provide visual indication that the container has been previously opened.

Plastic tamper-evident closures comprise two general types, a shrink-fitted type having a band which is shrunk around the container after the closure has been applied (see U.S. Pat. No. 4,349,399, for example) and a mechanical lock type having a band which provides for locking engagement with the container as the closure is applied thereto. Shrink-fitted closures typically have been formed of thermally-sensitive plastic material which, when subjected to heating, shrinks into tight-fitting engagement with the container to which it has been applied. Without such heating, the shrink-fit closure will not form the requisite tight-fitting engagement for tamper indication. Also, the shrink-fit cap locking structure typically is not subjected to any significant degree of mechanical loading during initial cap application.

The mechanical lock type of tamper-evident closure has been perceived as an improvement over heat-activated, shrink-fit closure systems because it requires no heat input and is, therefore, more economical to install; however, mechanical lock closures have been subject to other diseconomies and structural limitations which limit the economic advantage thereof over alternative tamper-evident closure systems. For example, during application of a mechanical lock closure to a container, the frangible portion thereof must deform, without self-destructing, to override the corresponding lock portion of the container. Any destruction of the closure locking elements (e.g., vertically extending bridges or vertical score lines) during closure application will render the intended tamper-evidencing capability thereof essentially useless. This results in significant quantities of defectively capped packages and many wasteful recapping operations to correct the defects.

Designing the frangible bridges or other such elements to withstand greater deformation upon closure installation introduces undesirable diseconomy of material use, limits the available choices for closure material and design specifications, and may result in a closure which is difficult to remove from its container, or whose tamper-evidencing structures will not readily fail on closure removal. For example, polypropylene, which is one commonly used material for mechanical lock type caps, is quite sensitive to high force loading. In general, it will absorb a magnitude of loading if the load is applied slowly, but will shatter if the same load is applied quickly. Thus, the design parameters of a polypropylene cap will have a direct impact upon the permissible rate of cap application for any given capping operation.

BRIEF SUMMARY OF THE INVENTION

The present invention contemplates a novel and improved capping system for installation of mechanical lock type tamper-evident caps to containers, and further, a novel and improved method of tamper-evident cap installation.

More particularly, the invention concerns a system and method for applying a tamper-evident, mechanical lock type closure to a container by heating a portion thereof, preferably the band and bridges, or other tamper-evidencing portion of a heat-sensitive closure. The closure is formed from material of such properties that the tamper-evidencing structure thereof becomes sufficiently pliable upon heating to withstand the deformation of cap installation without destruction. The closure thus is more amenable to design modifications incorporated to benefit cost economy, installation reliability and reliability of operation. For example, the invention permits a closure to be designed with weaker or smaller section bridges for both material cost economy and improved assurance that the bridges will fracture, as intended, upon initial cap removal. The heating provides the cap band and bridges with sufficient flexibility that even very small section bridges will remain intact as the connected band overrides the container flange upon initial cap installation.

Other advantages of the invention include the capability to reliably and uniformly install caps on containers whose design results in interference between the container and the cap band prior to cap thread engagement upon the container. The invention also permits reliable use of a tamper-evident plastic cap having a destructible band which is formed with transversely weakened vertical sections spaced circumferentially about the inner periphery thereof in the manner of an "8-score" cap structure.

The method of the invention is preferably carried out by providing an air tunnel and a blower or fan for directing a stream of ambient air through the tunnel to be heated therein by an electric resistance heating element. An outlet nozzle directs the heated air at the caps which are to be heated. As the caps move along in a continuous stream past the outlet nozzle, each is exposed to the hot airflow for a predetermined period of time to heat the caps to a specified elevated temperature. The caps retain the elevated temperature for a sufficient period after heating that the resultant pliability of the cap permits easy, reliable cap installation on a container. Subsequently, as the installed caps cool, they return to their normal ambient temperature material properties, which include sufficiently limited pliability to ensure destruction of the tamper-evidencing structure upon initial cap removal.

Accordingly, it is one primary object of the invention to provide a novel and improved method and system for sealing a container with a thermoplastic or other heat-sensitive mechanical lock type tamper-evident closure.

Another more specific object of the invention is to provide a novel and improved method and system of tamper-evident cap installation including the controlled heating of a portion of a cap structure prior to cap installation to thereby reduce the incidence of failed capping operations for a given cap design or, alternatively, to maintain a higher degree of operational reliability than has been heretofore realized.

BRIEF DESCRIPTION OF THE DRAWINGS

These and other objects and advantages of the invention will become more readily apparent upon consideration of the following detailed description and the accompanying drawings, in which:

FIG. 1 is a fragmentary, generally schematic plan view of a capping system according to the present invention;

FIG. 2 is a side elevation taken generally on line II—II of FIG. 1; and

FIG. 3 is an enlarged fragmentary portion of FIG. 2.

DETAILED DESCRIPTION OF THE PREFERRED EMBODIMENTS

There is generally indicated at 10 in FIGS. 1 through 3 a simplified schematic representation of a container capping system which is operable according to the principles of one presently preferred embodiment of the instant invention. The system 10 is utilized for capping of containers with tamper-evident closures of the type generally characterized as mechanical lock type closures.

System 10 comprises a heating apparatus 12 which is utilized for controlled heating of mechanical lock type, preferably plastic, closures such as threaded caps 14 prior to installation of the closures on respective containers (not shown) in a capping operation. Accordingly, heating apparatus 12 comprises a powered blower or fan 16 which directs a stream of ambient air via a tunnel or duct 18 to a nozzle 20. A heating element, such as an electric resistance heater 22, for example, is disposed within duct 18 to heat the air flowing therethrough to a predeterminable temperature. Of course, suitable electrical connections are provided, as at 24, for example, whereby the resistance heater 22 is connected to a conventional electric power supply and control circuit 26 for control of airflow temperature.

The heated air stream flows via duct 18 to nozzle 20 which then directs a stream of heated air to heat caps 14. The caps 14 may be moving in a continuous stream along a predetermined path of travel on any conventional carrier 28 to a capping machine 29. Nozzle 20 is preferably elongated in the direction of travel of caps 14 to form a narrow, restricted opening 30 for directing the flow of heated air transversely of the caps 14 as they traverse a predetermined segment S of their path of travel. Segment S may, in theory, overlap a portion of the capping operation so long as the caps are heated before the tamper-evidencing band or other heated structures engage the container.

The rate of movement of carrier 28 is selectively variable such that the elevated temperature of caps 14 at installation may be precisely controlled by selective variation of both the air stream temperature and the time exposure of each cap to the heated air stream. Caps 14 thus approach the capping operation in an elevated temperature state such that, when removed from the carrier 28 for installation as by a conventional pick-off shoe (not shown), they are at the desired temperature for application to the container. The elevated cap temperature will afford sufficiently enhanced flexibility that it may be reliably installed without damage to its tamper-evidencing structural portions.

As mentioned, the cap 14 may incorporate a circumferential band 32 and a plurality of circumferentially spaced, vertical bridges 34 connecting band 32 to the main body of cap 14. The elevated temperature of band 32 and bridges 34 will provide them the flexibility required to override the locking flange of the container on which the cap 14 is to be installed. Subsequent removal of the cap 14 at ambient temperature will damage or destroy portions of the band 32 and/or bridges 34 as they are less pliable at ambient temperature.

The following represents one suitable scenario of system parameters and operation for the application of closures in accordance with the present invention.

The closures are heated by an air stream just prior to application as they travel from a hopper to a pick-off shoe. The air stream is maintained at a maximum temperature of approximately 130° F. The closures are exposed to the air stream for approximately 7.5 seconds when the equipment is operating at 250 capping operations per minute. The closures themselves reach a temperature of approximately 115° F. to 120° F. and will remain at this temperature for several minutes. Excessive heating of the closures, to a temperature of 125° F. to 130° F., for example, will result in a soft closure which deforms excessively upon application. The desired temperature of the air stream is dependent upon the incoming closure temperature, of course. If extremely cold closures (e.g., 40° F.) were to be applied, the air stream temperature would have to be increased accordingly to achieve the desired 115° F. to 120° F. closure temperature for the same rate of capping operations.

As shown in FIG. 3, it is considered desirable and preferable to heat only those portions of a closure which, upon heating, will permit the cap locking structures to override a container locking structure during cap installation. Accordingly, in FIG. 3, nozzle opening 30 is restricted and positioned so as to direct the hot air stream at the band 32 and bridges 34 of cap 14 while the rest of the cap 14 remains substantially at ambient temperature. This is considered desirable, although not mandatory, because a heated cap may deform excessively and thus be subject to thread mismatch upon installation, overtightening, bulging or failure to seal properly, among other problems.

From the above description, the broad method of the invention will be readily seen to comprise the heating of at least a portion of a tamper-evident, heat-sensitive closure prior to installation whereby the closure is, by virtue of the heating, sufficiently pliable that its tamper-indicating structure will override the cooperating structure of a container, without damage, during closure installation on the container.

According to the description hereinabove, the present invention provides for a novel and improved container capping system and method which afford heretofore unrealized advantages of cap installation reliability, tamper-indication reliability, closure material cost economy, and available closure design variations by the utilization of preheating of at least a portion of the cap structure to permit the tamper-indicating portions thereof to override cooperating portions of the container without damage.

Inasmuch as numerous alternative and modified embodiments of the invention are contemplated by the inventors, it is intended that the invention be construed as broadly as permitted by the scope of the claims appended hereto.

What is claimed is:

1. The method of sealing a container with a mechanical lock type tamper-evident closure comprising the steps of:
   providing such a closure with
   a preformed thermoplastic tamper-indicating portion which is configured to cooperate with a container to provide visible indication of tampering upon first removal of the closure from the container;
   applying heat to said tamper indicating portion to induce an increase in the flexibility thereof sufficient to permit application of the closure to a container without damage to said tamper-indicating portion;
   maintaining said increased flexibility for a limited period;
   applying said closure to a container during said limited period; and
   permitting said closure to return to said normal flexibility whereby, upon subsequent removal of said closure from said container, said tamper-indicating portion will provide said visible indication of tampering.

2. The method as claimed in claim 1 wherein said tamper-indicating portion is a frangible portion which fractures upon first removal of said closure from said container to provide said visible indication of tampering.

3. In a container sealing process wherein a container has applied thereto a mechanical lock type tamper-indicating closure which includes a tamper indicating portion having temperature-sensitive flexibility properties, the method of reducing the incidence of damage to said tamper-indicating portion of the closure during closure application comprising the steps of:
   providing a flow of heated air;
   directing said flow of heated air at said closure to heat said tamper-indicating portion and thereby temporarily increase the mechanical flexibility thereof;
   installing said closure on a container while maintaining said increased flexibility; and
   subsequently permitting said tamper-indicating portion of the installed closure to cool to ambient temperature to thereby terminate the temporary increase in the mechanical flexibility thereof.

4. The method as claimed in claim 3 wherein said tamper-indicating portion is a frangible portion which fractures upon first removal of said closure from said container to provide said visible indication of tampering.

* * * * *